(12) United States Patent
Li et al.

(10) Patent No.: US 11,477,763 B2
(45) Date of Patent: Oct. 18, 2022

(54) COMMUNICATION METHOD AND COMMUNICATIONS APPARATUS

(71) Applicant: HUAWEI TECHNOLOGIES CO., LTD., Shenzhen (CN)

(72) Inventors: Hua Li, Shanghai (CN); Hao Tang, Shanghai (CN); Zhenfei Tang, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 250 days.

(21) Appl. No.: 16/876,089

(22) Filed: May 17, 2020

(65) Prior Publication Data

US 2020/0280964 A1   Sep. 3, 2020

Related U.S. Application Data

(63) Continuation of application No. PCT/CN2018/115786, filed on Nov. 16, 2018.

(30) Foreign Application Priority Data

Nov. 17, 2017   (CN) .......................... 201711146378.2

(51) Int. Cl.
*H04W 72/04* (2009.01)
*H04W 56/00* (2009.01)

(52) U.S. Cl.
CPC .......... *H04W 72/04* (2013.01); *H04W 56/001* (2013.01); *H04W 56/002* (2013.01); *H04W 56/0015* (2013.01)

(58) Field of Classification Search
CPC ........... H04W 56/001; H04W 56/0015; H04W 56/002; H04W 56/0025; H04W 72/04
See application file for complete search history.

(56) References Cited

U.S. PATENT DOCUMENTS

2015/0319776 A1   11/2015   Seo et al.
2016/0095074 A1*   3/2016   Park ...................... H04W 72/10
                                                                370/350
(Continued)

FOREIGN PATENT DOCUMENTS

CN   106376050 A   2/2017
CN   106850165 A   6/2017
(Continued)

OTHER PUBLICATIONS

Huawei et al.,"Overview of wider bandwidth operations", 3GPP TSG RAN WG1 NR Ad Hoc Meeting, R1-1709972, Qingdao, China, Jun. 27-30, 2017, total 9 pages.
(Continued)

*Primary Examiner* — Raj Jain
(74) *Attorney, Agent, or Firm* — Hauptman Ham, LLP

(57) ABSTRACT

Various embodiments provide a communication method and a communications apparatus. In those embodiments, a terminal device receives first indication information and second indication information from a network device. The first indication information indicates a position of a first reference point, the second indication information indicates a first quantity, the first quantity is a quantity of offset units between the first reference point and a second reference point, and the second reference point is an endpoint of a first physical resource block (PRB). The terminal device determines a position of the first PRB based on the first indication information, the second indication information, and an identifier of a subcarrier corresponding to the first reference point. Therefore, the terminal device can complete, without learning of a system bandwidth, a process of determining a PRB corresponding to a start point of a PRB number in the system bandwidth.

14 Claims, 6 Drawing Sheets

(56) References Cited

U.S. PATENT DOCUMENTS

| | | | |
|---|---|---|---|
| 2017/0237463 A1* | 8/2017 | Zheng | H04L 5/001 370/328 |
| 2018/0034599 A1 | 2/2018 | Zhou et al. | |
| 2020/0028599 A1* | 1/2020 | Zhang | H04B 7/08 |
| 2020/0280964 A1* | 9/2020 | Li | H04L 5/0044 |

FOREIGN PATENT DOCUMENTS

| | | |
|---|---|---|
| CN | 106961734 A | 7/2017 |
| CN | 107241798 A | 10/2017 |
| WO | 2014088294 A1 | 6/2014 |

OTHER PUBLICATIONS

Huawei et al:"Coexi stence of different UE types on a wideband carrier",3GPP Draft; R1-1715570,Sep. 17, 2017 (Sep. 17, 2017),XP051339037,tptal 6 pages.

3GPP TSG RAN WG1 Meeting #90 R1-1713733: Coexistence of different UE types on a wideband carrier ,Huawei, HiSilicon,Aug. 25, 2017,total 6 pages.

Qualcomm Incorporated et al,"WF on Channel Raster for NR",3GPP TSG-RAN WG4 RAN#84 Bis,R4-1711734, Dubrovnik, Croatia, Oct. 9-13, 2017, total 5 pages.

Samsung: "on Bandwidth Part Operation",3GPP Draft; R1-1717675,Oct. 8, 2017 (Oct. 8, 2017), XP051340860, total 8 pages.

3GPP TSG RAN WG1 Meeting NR#3 R1-1716288,:On PRB bundling for DL Intel Corporation Sep. 21, 2017,total 4 pages.

Nokia et al: "Remaining details on NR-PBCH",3GPP Draft; R1-1716524,Sep. 17, 2017 (Sep. 17, 2017), XP051339977,total 14 pages.

Panasonic: "Discussion on PRB grid and PRB indexing",3GPP Draft; R1-1710943,Jun. 26, 2017 (Jun. 26, 2017), XP051300144,total 6 pages.

* cited by examiner

COMMUNICATION METHOD AND COMMUNICATIONS APPARATUS

CROSS-REFERENCE TO RELATED APPLICATIONS

This application is a continuation of International Application No. PCT/CN2018/115786, filed on Nov. 16, 2018, which claims priority to Chinese Patent Application No. 201711146378.2, filed on Nov. 17, 2017. The disclosures of the aforementioned applications are hereby incorporated by reference in their entireties.

TECHNICAL FIELD

This application relates to the communications field, and more specifically, to a communication method and a communications apparatus.

BACKGROUND

In a communication process, a network device indicates an allocated resource to a terminal device, and the terminal receives and sends a signal on the indicated resource. The resource is allocated by using a granularity as a unit. In LTE, the granularity may be an RB or an RBG In LTE, a base station sends a synchronization signal and a broadcast signal to a terminal. The terminal determines a central position of a system bandwidth by detecting the synchronization signal. In addition, a position and a size of an entire system bandwidth may be determined with reference to the system bandwidth indicated in the synchronization signal. In this case, the base station and the terminal have same understanding of the position and the size of the system bandwidth. Based on same understanding of resources, the resources are numbered by using an RB as a granularity. The base station indicates a resource of the UE by using a number of an RB. The UE may uniquely determine the allocated resource based on the number of the RB.

In NR, how to implement that the terminal device determines, without learning of the system bandwidth, the resource indicated by the base station to the UE is a problem that needs to be resolved.

SUMMARY

Various embodiments provide a communication method and a communications apparatus, so that a terminal device can number a PRB in a system bandwidth without learning of the system bandwidth.

According to a first aspect, a communication method is provided. The method includes: receiving, by a terminal device, first indication information and second indication information from a network device, where the first indication information is used to indicate a position of a first reference point, the second indication information is used to indicate a first quantity, the first quantity is a quantity of offset units between the first reference point and a second reference point, and the second reference point is an endpoint of a first physical resource block PRB; and determining, by the terminal device, a position of the first PRB based on the first indication information, the second indication information, and an identifier of a subcarrier corresponding to the first reference point.

Therefore, a process of determining a start point of a PRB number of a system bandwidth based on first system information can still be completed when the terminal device does not learn of a size of the system bandwidth. Because the network device does not need to notify the terminal device of the size of the system bandwidth, a flexible change in a carrier bandwidth can be supported, a spectrum usage method can be adjusted, and signaling overheads used to indicate the system bandwidth can be reduced.

In some embodiments, the identifier of the subcarrier corresponding to the first reference point may be a sequence number of the subcarrier corresponding to the first reference point; or the identifier of the subcarrier corresponding to the first reference point may be information related to the subcarrier corresponding to the first reference point.

In some embodiments, the method further includes: receiving, by the terminal device, third indication information from the network device, where the third indication information is used to indicate the identifier of the subcarrier corresponding to the first reference point.

Therefore, a process in which the terminal device determines the identifier of the subcarrier corresponding to the first reference point can be easily implemented.

In some embodiments, the identifier of the subcarrier corresponding to the first reference point has a correspondence with a case of whether the first quantity is an odd number or an even number.

In some embodiments, the method further includes: determining, by the terminal device based on a first case, the identifier of the subcarrier corresponding to the first reference point, where the first case is a case of whether the first quantity is an odd number or an even number.

Therefore, signaling overheads used to indicate the identifier of the subcarrier corresponding to the first reference point can be reduced.

In some embodiments, the determining, by the terminal device based on a parity of the first quantity, the identifier of the subcarrier corresponding to the first reference point includes: determining, by the terminal device based on the first case and a second case, the identifier of the subcarrier corresponding to the first reference point, where the second case is a case of whether a size of one offset unit is a resource unit or half a resource unit.

Therefore, flexibility of configuring the first PRB can be improved, and accuracy of the identifier of the subcarrier corresponding to the first reference point can be improved.

In some embodiments, the second case is predefined.

In some embodiments, the method further includes: receiving, by the terminal device, fourth indication information from the network device, where the fourth indication information is used to indicate the second case.

In some embodiments, the determining, by the terminal device, a position of the first physical resource block PRB based on the first indication information, the second indication information, and an identifier of a subcarrier corresponding to the first reference point includes: determining, by the terminal device, the position of the first physical resource block PRB based on the first indication information, the second indication information, the identifier of the subcarrier corresponding to the first reference point, and the size of the offset unit.

Therefore, flexibility of configuring the first PRB can be improved.

In some embodiments, the size of the offset unit is a preset value.

In some embodiments, the size of the offset unit is determined based on the first system information.

In some embodiments, the first system information includes information about at least one parameter of a first numerology numerology, a subcarrier spacing corresponding to the first numerology, or a cyclic prefix CP corresponding to the first numerology.

In some embodiments, the first PRB is used to number each PRB in a public bandwidth based on the first system information.

In some embodiments, the terminal device receives fifth indication information from the network device, where the fifth indication information is used to indicate the size of the offset unit.

In some embodiments, the first system information is predefined.

In some embodiments, the method further includes: receiving, by the terminal device, the first system information from the network device.

In some embodiments, when system information used by the network device is the first system information, the method further includes: numbering, by the terminal device, each PRB in the system bandwidth based on the first PRB.

In some embodiments, when system information used by the network device is second system information, the method further includes: determining, by the terminal device, positional relationship information, where the positional relationship information is used to indicate a positional relationship between K PRBs including the first PRB, the K PRBs have a one-to-one correspondence with K pieces of system information, each of the K PRBs is used to number each PRB in the system bandwidth based on corresponding system information, and K is a positive integer greater than or equal to 2; determining, by the terminal device, a position of the second PRB based on the positional relationship information and the position of the first PRB, where the second PRB corresponds to the second system information; and numbering, by the terminal device, each PRB in the system bandwidth based on the second PRB.

In some embodiments, the system bandwidth is a bandwidth corresponding to a secondary component carrier or a supplementary carrier.

In some embodiments, the system bandwidth is used for frequency division duplex FDD-based communication.

More specifically, the system bandwidth is used for FDD-based uplink communication.

According to a second aspect, a communication method is provided. The method includes: determining, by a network device, a first quantity based on a position of a first reference point, a position of a first physical resource block PRB, and an identifier of a subcarrier corresponding to the first reference point, where the first quantity is a quantity of offset units between the first reference point and a second reference point, and the second reference point is an endpoint of the first PRB; and sending, by the network device, first indication information and second indication information to a terminal device, where the first indication information is used to indicate the position of the first reference point, and the second indication information is used to indicate the first quantity.

In some embodiments, the identifier of the subcarrier corresponding to the first reference point may be a sequence number of the subcarrier corresponding to the first reference point; or the identifier of the subcarrier corresponding to the first reference point may be information related to the subcarrier corresponding to the first reference point.

Therefore, a process of determining a start point of a PRB number of a system bandwidth based on first system information can still be completed when the terminal device does not learn of a size of the system bandwidth. Because the network device does not need to notify the terminal device of the size of the system bandwidth, a flexible change in a carrier bandwidth can be supported, a spectrum usage method can be adjusted, and signaling overheads used to indicate the system bandwidth can be reduced.

In some embodiments, the method further includes: sending, by the network device, third indication information to the terminal device, where the third indication information is used to indicate the identifier of the subcarrier corresponding to the first reference point.

Therefore, a process in which the terminal device determines the identifier of the subcarrier corresponding to the first reference point can be easily implemented.

In some embodiments, the identifier of the subcarrier corresponding to the first reference point has a correspondence with a case of whether the first quantity is an odd number or an even number.

In some embodiments, the identifier of the subcarrier corresponding to the first reference point is determined based on the first case, and the first case is a case of whether the first quantity is an odd number or an even number.

Therefore, signaling overheads used to indicate the identifier of the subcarrier corresponding to the first reference point can be reduced.

In some embodiments, the identifier of the subcarrier corresponding to the first reference point is determined based on the first case and the second case, where the second case is a case of whether a size of one offset unit is a resource unit or half a resource unit.

Therefore, flexibility of configuring the first PRB can be improved, and accuracy of the identifier of the subcarrier corresponding to the first reference point can be improved.

In some embodiments, the second case is predefined.

In some embodiments, the method further includes: sending, by the network device, fourth indication information to the terminal device, where the fourth indication information is used to indicate the second case.

In some embodiments, the first physical resource block PRB is determined based on the size of the offset unit.

Therefore, flexibility of configuring the first PRB can be improved.

In some embodiments, the size of the offset unit is a preset value.

In some embodiments, the size of the offset unit is determined based on the first system information.

In some embodiments, the first system information includes information about at least one parameter of a first numerology numerology, a subcarrier spacing corresponding to the first numerology, or a cyclic prefix CP corresponding to the first numerology.

In some embodiments, the first PRB is used to number each PRB in a public bandwidth based on the first system information.

In some embodiments, the method further includes: sending, by the network device, fifth indication information to the terminal device, where the fifth indication information is used to indicate the size of the offset unit.

In some embodiments, the first system information is predefined.

In some embodiments, the method further includes: sending, by the network device, the first system information to the terminal device.

In some embodiments, when system information used by the network device is the first system information, the method further includes: numbering, by the network device, each PRB in the system bandwidth based on the first PRB.

In some embodiments, when system information used by the network device is second system information, the method further includes: determining, by the network device, positional relationship information, where the positional relationship information is used to indicate a positional relationship between K PRBs including the first PRB, the K PRBs have a one-to-one correspondence with K pieces of system information, each of the K PRBs is used to number each PRB in the system bandwidth based on corresponding system information, and K is a positive integer greater than or equal to 2; determining, by the network device, a position of the second PRB based on the positional relationship information and the position of the first PRB, where the second PRB corresponds to the second system information; and numbering, by the network device, each PRB in the system bandwidth based on the second PRB.

In some embodiments, the system bandwidth is a bandwidth corresponding to a secondary component carrier or a supplementary carrier.

In some embodiments, the system bandwidth is used for frequency division duplex FDD-based communication.

More specifically, the system bandwidth is used for FDD-based uplink communication.

According to a third aspect, a communications apparatus is provided. The apparatus includes units configured to perform steps in the first aspect or the second aspect or any implementation of the first aspect or the second aspect.

According to a fourth aspect, a communications device is provided. The device includes a processor, configured to invoke a computer program from a memory and run the computer program, so that the communications device performs the method in the first aspect or the second aspect or any implementation of the first aspect or the second aspect.

According to a fifth aspect, a chip system is provided. The system includes a processor, configured to invoke a computer program from a memory and run the computer program, so that a device in which the chip system is installed performs the method in the first aspect or the second aspect or any implementation of the first aspect or the second aspect.

According to a sixth aspect, a computer program product is provided. The computer program product includes computer program code. When the computer program code is run by a communications unit, a processing unit, a transceiver, or a processor of a communications device (for example, a terminal device or a network device), the communications device is enabled to perform the method in the first aspect or the second aspect or any implementation of the first aspect or the second aspect.

According to a seventh aspect, a computer-readable storage medium is provided. The computer-readable storage medium stores a program. The program enables a communications device (for example, a terminal device or a network device) to perform the method in the first aspect or the second aspect or any implementation of the first aspect or the second aspect.

According to the solutions provided in this application, the process of determining the start point of the PRB number of the system bandwidth based on the first system information can still be completed when the terminal device does not learn of a size of the system bandwidth. Because the network device does not need to notify the terminal device of the size of the system bandwidth, a flexible change in the carrier bandwidth can be supported, the spectrum usage method can be adjusted, and the signaling overheads used to indicate the system bandwidth can be reduced.

DESCRIPTION OF EMBODIMENTS

Figure 1:
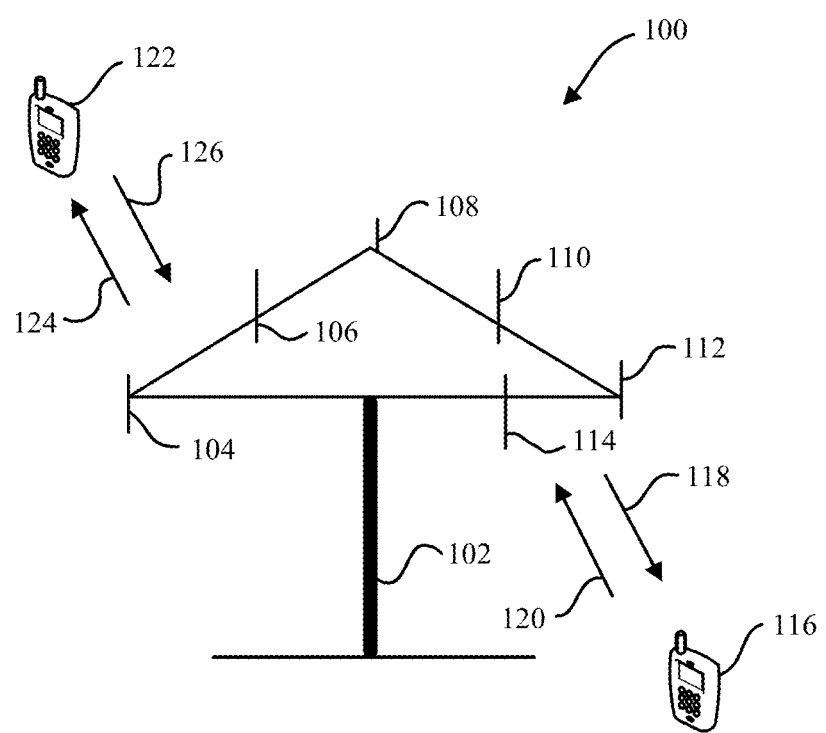
FIG. 1 is a schematic structural diagram of an example of a communications system according to this application.

The following describes technical solutions in this application with reference to the accompanying drawings.

The technical solutions of embodiments of this application may be applied to various communications systems, such as a global system for mobile communication (GSM) system, a code division multiple access (CDMA) system, a wideband code division multiple access (WCDMA) system, a general packet radio service (GPRS), a long term evolution (LTE) system, an LTE frequency division duplex (FDD) system, an LTE time division duplex (TDD), a universal mobile telecommunications system (UMTS), a worldwide interoperability for microwave access (WiMAX) communications system, a future 5th generation (5G) system, or a new radio (NR) system.

As an example rather than a limitation, in various embodiments, a terminal device may also be referred to as user equipment (UE), an access terminal, a subscriber unit, a subscriber station, a mobile station, a mobile console, a remote station, a remote terminal, a mobile device, a user terminal, a terminal, a wireless communications device, a user agent, or a user apparatus. The terminal device may be a station (ST) in a WLAN, or may be a cellular phone, a cordless phone, a session initiation protocol (SIP) phone, a wireless local loop (WLL) station, a personal digital processing (PDA) device, a handheld device with a wireless communication function, a computing device, or another processing device connected to a wireless modem, a vehicle-mounted device, a wearable device, and a next-generation communications system, for example, a terminal device in a 5G network or a terminal device in a future evolved public land mobile network (PLMN) network.

As an example rather than a limitation, in various embodiments, the terminal device may be a wearable device. The wearable device may also be referred to as a wearable intelligent device, and is a general term for wearable devices such as glasses, gloves, watches, clothes, and shoes that are developed by applying wearable technologies to intelligent designs of daily wearing. The wearable device is a portable device that can be directly worn on a body or integrated into clothes or an accessory of a user. The wearable device is not merely a hardware device, but also is used to implement a powerful function through software support, data interaction, and cloud interaction. Generalized wearable intelligent devices include full-featured and large-size devices that can implement complete or partial functions without depending on smartphones, such as smart watches or smart glasses, and devices that focus on only one type of application and need to work with other devices such as smartphones, such as various smart bands or smart jewelry for monitoring physical signs.

In some embodiments, in various embodiments, the terminal device may be a terminal device in an Internet of Things (IoT) system. IoT is an important composition part of information technology development in the future, and has a main technical feature in which things are connected to a network by using a communications technology to implement a man-machine connected and thing-thing connected intelligent network.

In various embodiments, an IoT technology may implement massive connections, deep coverage, and terminal power saving by using, for example, a narrowband (NB) technology. For example, an NB includes only one resource block (RB), that is, a bandwidth of the NB is only 180 KB. To implement massive access, terminals need to be discrete in access. According to a communication method in various embodiments, a congestion problem that occurs in the IoT technology when massive terminals access a network by using the NB can be effectively resolved.

In one embodiment, a network device may include an access network device or a core network device.

The access network device may be a device configured to communicate with a mobile device. The access network device may be an access point (AP) in a WLAN, a base transceiver station (BTS) in GSM or CDMA, a nodeB (NB) in WCDMA, a gNB in a new radio (NR) system, an evolved nodeB (eNB, or eNodeB) in LTE, a relay station or an access point, a vehicle-mounted device, a wearable device, an access network device in a future 5G network, an access network device in a future evolved PLMN network, or the like.

In addition, in various embodiments, the access network device provides a service for a cell, and the terminal device communicates with the access network device by using a transmission resource (for example, a frequency domain resource or a spectrum resource) used by the cell. The cell may be a cell corresponding to the access network device (for example, a base station), and the cell may belong to a macro base station, or may belong to a base station corresponding to a small cell. The small cell herein may include: a metro cell, a micro cell, a pico cell, a femto cell (Femto cell), and the like. These small cells feature in small coverage and low transmit power, and are applicable to providing a high-rate data transmission service.

In addition, in an LTE system or a 5G system, a plurality of cells may simultaneously work on a carrier at a same frequency. In some special scenarios, it may be considered that a concept of the carrier is equivalent to a concept of a cell. For example, in a carrier aggregation (CA) scenario, when a secondary component carrier is configured for UE, both a carrier index of the secondary component carrier and a cell identity (Cell ID) of a secondary cell operating on the secondary component carrier are carried. In this case, the carrier and the cell may be considered to be conceptually the same. For example, that the UE accesses a carrier is the same as that the UE accesses a cell.

The core network device may be connected to a plurality of access network devices, and configured to control the access network devices, and may distribute, to the access network devices, data received from a network side (for example, the Internet).

The foregoing listed functions and specific implementations of the terminal device, the access network device, and the core network device are merely examples for description, and this application is not limited thereto.

In various embodiments, the terminal device or the network device includes a hardware layer, an operating system layer running on the hardware layer, and an application layer running on the operating system layer. The hardware layer includes hardware such as a central processing unit (CPU), a memory management unit (MMU), and a memory (also referred to as a main memory). The operating system may be any one or more computer operating systems that implement service processing by using a process, for example, a Linux operating system, a Unix operating system, an Android operating system, an iOS operating system, or a Windows operating system. The application layer includes applications such as a browser, an address book, word processing software, and instant messaging software. In addition, various embodiments do not particularly limit a specific structure of an execution body of the method provided in various embodiments, provided that a program recording code of the method provided in various embodiments can be run to implement communication according to the method provided in various embodiments. For example, the execution body of the method provided in various embodiments may be a terminal device or a network device, or may be a functional module capable of invoking and executing a program in the terminal device or the network device.

In addition, aspects or features in various embodiments may be implemented as a method, an apparatus, or a product that uses standard programming and/or engineering technologies. The term "product" used in this application covers a computer program that can be accessed from any computer-readable component, carrier, or medium. For example, the computer-readable medium may include, but is not limited to: a magnetic storage component (for example, a hard disk, a floppy disk, or a magnetic tape), an optical disc (for example, a compact disc (CD), a digital versatile disc (DVD), a smart card, and a flash memory component (for example, an erasable programmable read-only memory (EPROM), a card, a stick, or a key drive). In addition, various storage media described in this specification may indicate one or more devices and/or other machine-readable media that are configured to store information. The term "machine-readable media" may include, but is not limited to a radio channel, and various other media that can store, include, and/or carry an instruction and/or data.

It should be noted that in various embodiments, a plurality of application programs may be run at the application layer. In this case, an application program for performing the communication method in various embodiments and an application program configured to control a receive end device to implement an action corresponding to received data may be different application programs.

FIG. 1 is a schematic diagram of a system 100 to which a communication method according an embodiment of this application can be applied. As shown in FIG. 1, the system 100 includes an access network device 102. The access network device 102 may include one or more antennas, for example, antennas 104, 106, 108, 110, 112, and 114. In addition, the access network device 102 may further include a transmitter chain and a receiver chain. A person of ordinary skill in the art can understand that the transmitter chain and the receiver chain each may include a plurality of components related to signal sending and receiving (for example, a processor, a modulator, a multiplexer, a demodulator, a demultiplexer, or an antenna).

The access network device 102 may communicate with a plurality of terminal devices (for example, a terminal device 116 and a terminal device 122). However, it may be understood that the access network device 102 may communicate with any quantity of terminal devices that are similar to the terminal device 116 or the terminal device 122. The terminal devices 116 and 122 each may be, for example, a cellular phone, a smartphone, a portable computer, a handheld communications device, a handheld computing device, a satellite radio apparatus, a global positioning system, a PDA, and/or any other suitable device used for communication in the wireless communications system 100.

As shown in FIG. 1, the terminal device 116 communicates with the antennas 112 and 114. The antennas 112 and 114 transmit information to the terminal device 116 over a forward link (also referred to as a downlink) 118, and receive information from the terminal device 116 over a reverse link (also referred to as an uplink) 120. In addition, the terminal device 122 communicates with the antennas 104 and 106. The antennas 104 and 106 send information to the terminal device 122 over a forward link 124, and receive information from the terminal device 122 over a reverse link 126.

For example, in a frequency division duplex (FDD) system, the forward link 118 may use a frequency band different from that used by the reverse link 120, and the forward link 124 may use a frequency band different from that used by the reverse link 126.

For another example, in a time division duplex (TDD) system and a full duplex system, the forward link 118 and the reverse link 120 may use a same frequency band, and the forward link 124 and the reverse link 126 may use a same frequency band.

Each antenna (or an antenna group including a plurality of antennas) and/or an area designed for communication are/is referred to as a sector of the access network device 102. For example, an antenna group may be designed to communicate with a terminal device in a sector within a coverage area of the access network device 102. The access network device may send signals to all terminal devices in a corresponding sector by using a single antenna or a multi-antenna transmit diversity. In a process in which the access network device 102 communicates with the terminal devices 116 and 122 respectively over the forward links 118 and 124, a transmit antenna of the access network device 102 may improve signal-to-noise ratios of the forward links 118 and 124 through beamforming. In addition, compared with a manner in which an access network device uses a single antenna or a multi-antenna transmit diversity to transmit signals to all terminal devices served by the network device, when the access network device 102 uses beamforming to transmit signals to the terminal devices 116 and 122 that are randomly scattered in the related coverage area, interference to a mobile device in a neighboring cell is less.

In a given time, the access network device 102, the terminal device 116, or the terminal device 122 may be a wireless communications sending apparatus and/or a wireless communications receiving apparatus. When sending data, the wireless communications sending apparatus may encode the data for transmission. Specifically, the wireless communications sending apparatus may obtain (for example, generate, receive from another communications apparatus, or store in a memory) a quantity of data bits that need to be sent to the wireless communications receiving apparatus through a channel. The data bits may be included in one transport block (or a plurality of transport blocks) of data, and the transport block may be segmented to generate a plurality of code blocks.

In addition, the communications system 100 may be a PLMN network, a D2D network, an M2M network, an IoT network, or another network. FIG. 1 is merely a simplified schematic diagram of an example. The network may further include another access network device, which is not drawn in FIG. 1.

As an example rather than a limitation, the communication method in this embodiment of this application may be applied to, for example, a communications system having a large bandwidth.

In some embodiments, with an increase of mobile users and emergence of large-capacity services (such as high-definition video services), an important aspect required for evolution of mobile communications to the future 5G system or NR system is to support a large bandwidth. A larger bandwidth indicates more bandwidth resources used for data transmission and a larger traffic volume that can be supported. In a communications system in which a carrier bandwidth is a large bandwidth, a bandwidth supported by UE may be lower than the carrier bandwidth in consideration of costs of the UE and a service volume of the UE. A larger bandwidth supported by the UE indicates a higher processing capability of the UE, a possible higher data transmission rate of the UE, and possible higher design costs of the UE. For example, in a 5G system, a maximum of the carrier bandwidth may be 400 megahertz (MHz), and a radio frequency bandwidth capability of the UE may be 20 MHz, 50 MHz, 100 MHz, or the like. In a wireless communications system, radio frequency bandwidth capabilities of different UEs may be the same or may be different.

In the communications system in which the large bandwidth is used as the carrier bandwidth, because the radio frequency bandwidth capability of the UE is smaller than the carrier bandwidth, a concept of a bandwidth part (Bandwidth Part or carrier Bandwidth Part, BWP) is introduced, to be specific, one BWP includes several PRBs that are contiguous in frequency domain.

When the network device allocates a BWP to the terminal device, the network device and the terminal device first need to have a consistent understanding of a granularity and position of a resource. Then, the network device indicates, to the terminal device, a PRB included in the BWP allocated to the terminal device, and further determines the BWP. Therefore, the communication method may be applied to a process in which the UE determines a position of the BWP and a quantity of PRBs included in the BWP.

Figure 2:
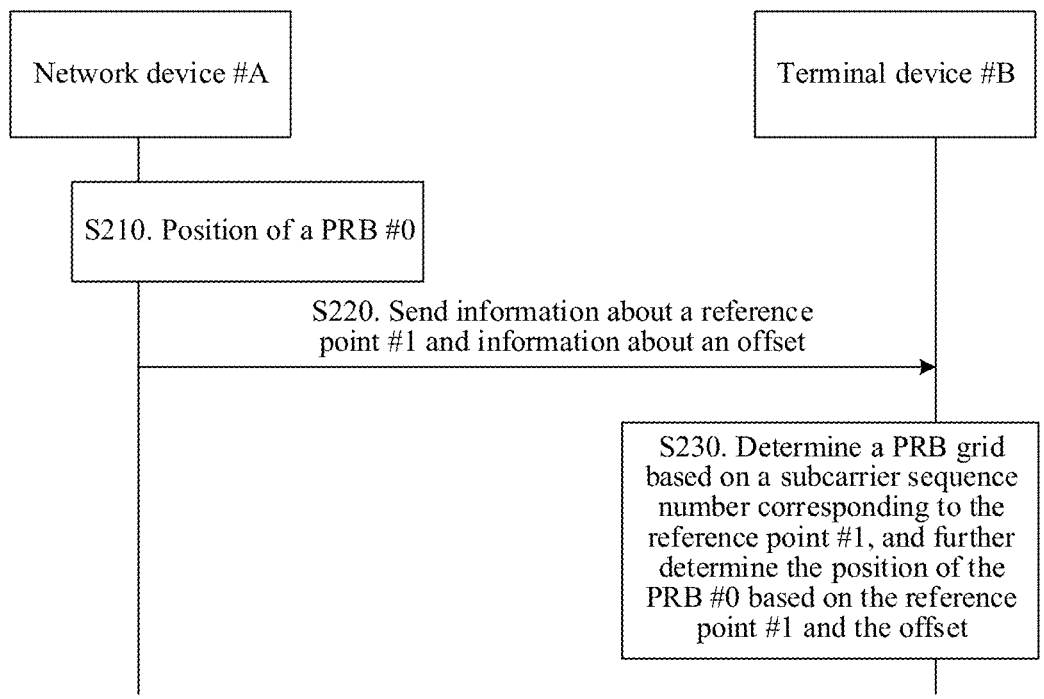
FIG. 2 is a schematic interaction diagram of an example of a communication method according to this application.

With reference to FIG. 2, the following describes a method 200 for determining a position of a reference PRB (denoted as a PRB #0) of a PRB number in a public bandwidth by a network device (for example, an access network device, denoted as a network device #A below for ease of understanding and description) and a terminal device (denoted as a terminal device #B below for ease of understanding and description). The public bandwidth is a maximum carrier bandwidth that may be supported by a system, for example, may be 275 PRBs. In some embodiments, the public bandwidth is an absolute PRB grid. The PRB #0 may be located in the system bandwidth, or the PRB #0 may be a PRB outside the system bandwidth. This is not particularly limited in this application. The system bandwidth is also referred to as a cell bandwidth. The carrier bandwidth is a bandwidth actually used by a base station. A function of the public bandwidth is to configure the BWP. The base station and the UE have a consistent understanding of a granularity and position of the public bandwidth. If the base station indicates a position and size of the BWP in the public bandwidth, the UE may determine the position and size of the corresponding BWP. By using the public bandwidth, the UE does not need to know a size of the system bandwidth actually used by the base station. After the UE determines the BWP, subsequent resource allocation is performed in the BWP.

In S210, the network device #A may determine a position (to be specific, a frequency domain position) of the PRB #0.

The PRB #0 is a reference point for numbering a PRB in the public bandwidth, that is, PRB numbers sequentially increase from the PRB #0 to a high frequency direction.

As an example rather than a limitation, in this embodiment of this application, the network device #A may determine the position of the PRB #0 based on resources (to be specific, frequency domain resources, for example, BWPs, which are denoted as BWPs #A below for ease of understanding and differentiation) that are allocated to a plurality of terminal devices #B in a cell and that are used for communication, so that a frequency corresponding to the PRB #0 is lower than a minimum frequency corresponding to BWPs #A of all UEs in the cell. In other words, the PRBs that are numbered based on the position of the PRB #0 include PRBs corresponding to all BWPs #A of all the UEs in the cell.

As an example rather than a limitation, assuming that a system bandwidth used by the network device #A is a system bandwidth #A, the frequency corresponding to the PRB #0 may be lower than a minimum frequency of the system bandwidth #A.

In some embodiments, the frequency corresponding to the PRB #0 may be higher than the minimum frequency of the system bandwidth #A. This is not particularly limited in this application.

As an example rather than a limitation, the PRB #0 may be used as a common physical resource block (Common PRB) in a cell provided by the network device #A.

In addition, the network device #A may determine a reference point (denoted as a reference point #1 below for ease of understanding and differentiation) used to determine the position of the PRB #0.

The reference point may be a position indicated by an absolute radio frequency channel number. The absolute radio frequency channel number in this embodiment of this application is obtained by performing numbering after a preconfigured frequency range is divided at a specified granularity. The specified granularity may be a channel raster. A size of one channel raster may be predefined. For example, a size of one channel raster is 100 kHz, or may be a size of one PRB, or may be a size of one subcarrier or the like. In this embodiment, the size of the channel raster is at subcarrier level. In some embodiments, in sub 6 GHz, a subcarrier spacing may be 15 kHz, and may be 60 kHz in a millimeter wave (mmWave) range.

As an example rather than a limitation, in this embodiment of this application, the network device #A may determine the reference point #1 based on a bandwidth of the system bandwidth #A.

For example, the network device #A may determine a central frequency of the system bandwidth #A as the reference point #1.

In addition, in this embodiment of this application, the network device #A may further determine a PRB grid of the system bandwidth #A, that is, an identifier of a subcarrier corresponding to the reference point #1.

As an example rather than a limitation, the identifier of the subcarrier may be a sequence number of the subcarrier.

It should be understood that, the foregoing listed specific parameters that are used as identifiers of subcarriers are merely examples for description, and this application is not limited thereto. Related information about other subcarriers may also be used as identifiers of the subcarriers. For ease of understanding and description, the following uses an example in which an identifier of a subcarrier is a sequence number of the subcarrier for description.

For example, the network device #A may further determine whether the reference point #1 corresponds to subcarrier No. 0 (denoted as a subcarrier #0) or subcarrier No. 6 (denoted as a subcarrier #6). In other words, the network device #A may further determine whether the radio absolute frequency channel number corresponds to the subcarrier #0 or the subcarrier #6.

As an example rather than a limitation, the network device #A may determine, based on a quantity of RBs included in the system bandwidth #A, whether a channel raster corresponds to the subcarrier #0 or the subcarrier #6.

For example, when the quantity of RBs is an even number, the network device #A may determine that the channel raster corresponds to the subcarrier #0, or the network device #A may determine that the reference point #1 corresponds to the subcarrier #0, that is, the network device #A may determine that the reference point #1 is a center of the subcarrier #0.

When the quantity of RBs is an odd number, the network device #A may determine that the channel raster corresponds to the subcarrier #6, or the network device #A may determine that the reference point #1 corresponds to the subcarrier #6, that is, the network device #A may determine that the reference point #1 is a center of the subcarrier #6.

It should be understood that the foregoing method for determining, by the network device #A, the PRB #0, the reference point #1, and the identifier of the subcarrier corresponding to the reference point #1 is merely an example for description, and this application is not limited thereto. Another method that can enable the network device to determine a start point of the PRB number and that is used to determine an absolute frequency position of the start point of the PRB number also falls within the protection scope of this application.

In addition, the network device #A may further determine an offset. Specifically, the offset indicates a quantity of offset units between the reference point #1 and a reference point #2. The reference point #2 may be a frequency domain endpoint of the PRB #0, for example, a smallest frequency of the PRB #0 or a position of a subcarrier 0 of the PRB #0.

That is, in this embodiment, there may be a plurality of offset units between the reference point #1 and the reference point #2, and each offset unit has a same size.

In addition, in this embodiment, the size of the offset unit may be measured by using a resource unit, in other words, there is a proportional relationship between the offset unit and a resource unit. The resource unit is described in detail subsequently.

That is, in this embodiment of this application, the size of one offset unit may be 1 resource unit; or in this embodiment, the size of one offset unit may be ½ resource unit.

As an example rather than a limitation, in this embodiment, the proportional relationship between the offset unit and the resource unit (that is, whether the size of one offset unit is a resource unit or half a resource unit) may be predefined. For example, the proportional relationship between the offset unit and the resource unit may be specified in a communication protocol. For another example, the proportional relationship between the offset unit and the resource unit may be preset by an operator or a manufacturer in the network device and the terminal device. For another example, the proportional relationship between the offset unit and the resource unit may be entered by a user or an administrator to the network device and the terminal device.

In some embodiments, as in this embodiment, the proportional relationship between the offset unit and the resource unit may be notified by the network device #A to the terminal device #B.

It should be understood that the foregoing listed manners for determining the proportional relationship between the offset unit and the resource unit are merely examples for description, and this application is not limited thereto, provided that the proportional relationship, determined by the network device #A, between the offset unit and the resource unit and the proportional relationship, determined by the terminal device #B, between the offset unit and the resource unit can be consistent.

The following describes the resource unit in detail.

In this embodiment, a size of the resource unit may be predefined. For example, the size of the resource unit may be specified in the communication protocol. For another example, the size of the resource unit may be preset by an operator or a manufacturer in the network device or the terminal device. For another example, the size of the resource unit may be entered by a user or an administrator to the network device and the terminal device.

Alternatively, in this embodiment, the size of the resource unit may be notified by the network device #A to the terminal device #B.

In this embodiment, the size of the resource unit may be measured by using a PRB, in other words, there is a proportional relationship between the resource unit and the PRB.

That is, in this embodiment of this application, the size of one resource unit may be 1 PRB; or in this embodiment, the size of one resource unit may be ½ PRB; or in this embodiment, the size of one resource unit may be ¼ PRB; or in this embodiment, the size of one resource unit may be ⅛ PRB.

In some embodiments, as in this embodiment, the size of the resource unit may be measured by using a subcarrier, in other words, there is a proportional relationship between the resource unit and the subcarrier.

That is, in this embodiment, the size of one resource unit may be 12 subcarriers; or in this embodiment, the size of one resource unit may be 6 subcarriers; or in this embodiment, the size of one resource unit may be 3 subcarriers; or in this embodiment, the size of one resource unit may be 1.5 subcarriers.

As an example rather than a limitation, in this embodiment, the proportional relationship between the resource unit and the PRB may be predefined. For example, the proportional relationship between the resource unit and the PRB may be specified in the communication protocol. For another example, the proportional relationship between the resource unit and the PRB may be preset by an operator or a manufacturer in the network device and the terminal device. For another example, the proportional relationship between the resource unit and the PRB may be entered by a user or an administrator to the network device and the terminal device.

In some embodiments, as in this embodiment, the proportional relationship between the resource unit and the PRB may be notified by the network device #A to the terminal device #B.

In some embodiments, as in this embodiment, the proportional relationship between the resource unit and the PRB may be determined based on system information.

For example, the system information may include a subcarrier spacing used by the system bandwidth.

For another example, the system information may further include a cyclic prefix (Cyclic Prefix, CP) used by the system bandwidth.

For another example, the system information may further include a numerology numerology used by the system bandwidth.

As an example rather than a limitation, Table 1 shows an example of a proportional relationship between resource units and PRBs corresponding to different system information.

TABLE 1

| Subcarrier spacing | Size of one resource unit |
| --- | --- |
| 15 kHz | ½ PRB (or 6 subcarriers) |
| 30 kHz | ¼ PRB (or 3 subcarriers) |
| 60 kHz | ⅛ PRB (or 1.5 subcarriers) |

In one case, a value range of the offset is 276*4*2, where 276 represents a maximum of 275 PRBs, considering that there may be a maximum offset of 1 PRB between a synchronization signal and a PRB grid of data, and 4 represents that a 60 kHz subcarrier spacing is 4 times a 15 kHz subcarrier spacing. If a granularity of ½ PRB of 15 kHz is used as the offset unit, the value range of the offset needs to be defined as 276*4*2.

It should be understood that the foregoing listed proportional relationships between the resource unit and the PRB are merely examples for description, and this application is not limited thereto, provided that the proportional relationship, determined by the network device #A, between the resource unit and the PRB and the proportional relationship, determined by the terminal device #B, between the resource unit and the PRB can be consistent.

In S220, the network device #A may send information #1 (that is, an example of first indication information) to the terminal device #B. The information #A is used to indicate the reference point #1. For example, the information #A is used to indicate the frequency domain position of the reference point #1.

In addition, the network device #A may send information #2 (that is, an example of second indication information) to the terminal device #B. The information #2 is used to indicate the offset, that is, the quantity of offset units between the reference point #1 and the reference point #2.

Therefore, in S230, the terminal device #B can determine the frequency domain position of the reference point #1 based on the information #1.

In addition, the terminal device #B may determine the quantity of offset units between the reference point #1 and the reference point #2 based on the information #2.

Figure 3:
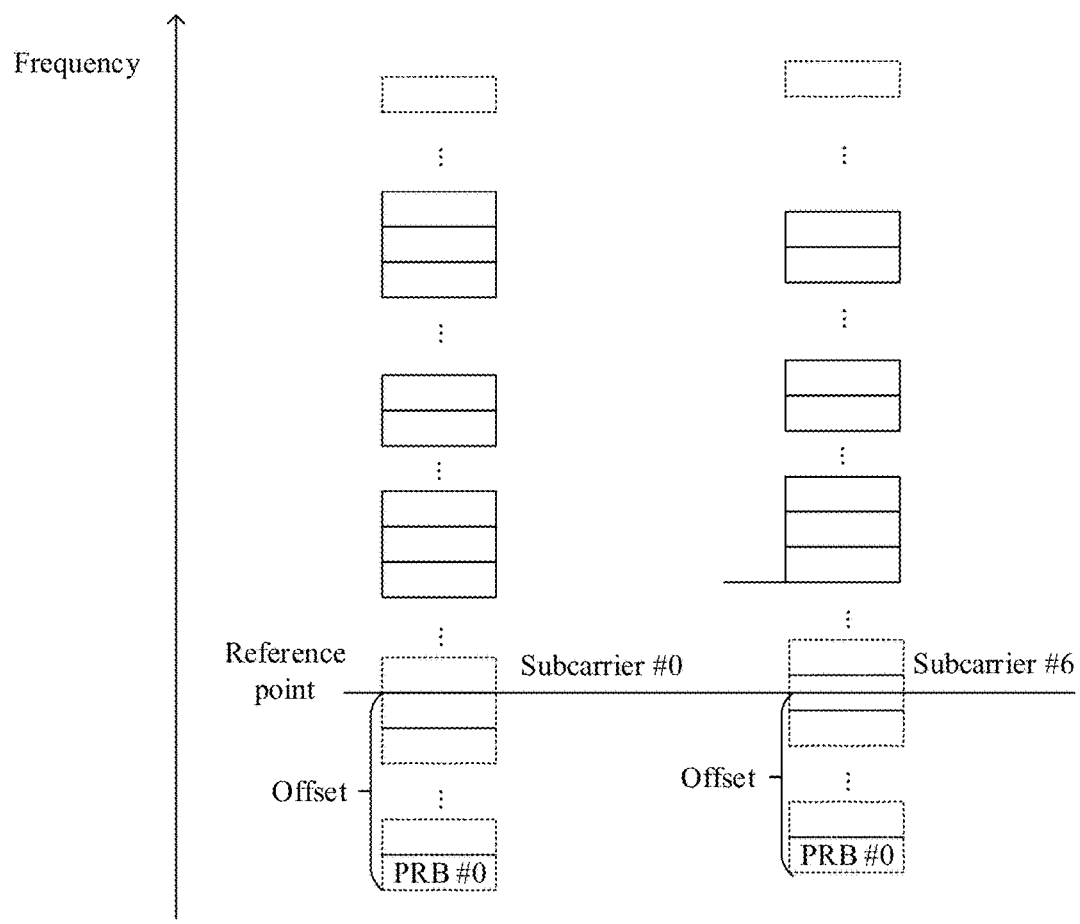
FIG. 3 is a schematic diagram of an offset.

As shown in FIG. 3, when identifiers of subcarriers corresponding to reference points are different, positions of finally determined start points of PRB numbers may be different.

Therefore, in S230, the terminal device #B may further determine the identifier of the subcarrier corresponding to the reference point #1.

As an example rather than a limitation, in this embodiment, the terminal device #B may further determine in the following manners, the identifier of the subcarrier corresponding to the reference point #1:

Manner 1

In some embodiments, the network device #A may further send information #3 to the terminal device #B. The information #3 may be used to indicate the identifier of the subcarrier corresponding to the reference point #1, that is, the information #3 may be used to indicate whether the reference point #1 corresponds to the subcarrier #0 or the subcarrier #6, in other words, the information #3 may be used to indicate whether the reference point #1 is a central frequency of the subcarrier #0 or a central frequency of the subcarrier #6.

Therefore, the terminal device #B may determine, based on the information #3, the identifier of the subcarrier corresponding to the reference point #1.

As an example rather than a limitation, the information #3 may occupy one bit.

As an example rather than a limitation, when the information #3 is sent, an offset granularity of the information #2 is a PRB, and a maximum offset range is 276*4.

In addition, as an example rather than a limitation, the information #3 may be carried in configuration information of a secondary cell (Scell), and is used to perform BWP configuration in the Scell. The configuration information of the Scell may be carried in radio resource control (RRC) signaling sent by the network device #A to the terminal device #B. In addition, In some embodiments, the RRC signaling may be dedicated RRC signaling of the terminal device #B.

In addition, as an example rather than a limitation, the information #3 may be carried in configuration information of an FDD uplink carrier of a secondary cell (Scell), and is configured to perform BWP configuration in the Scell in FDD. The configuration information of the Scell may be carried in radio resource control (RRC) signaling sent by the network device #A to the terminal device #B. In addition, In some embodiments, the RRC signaling may be dedicated RRC signaling of the terminal device #B.

As an example rather than a limitation, in this embodiment of this application, the foregoing method may further be used in BWP configuration of a supplementary uplink (SUL). In this case, the information #3 may be carried in configuration information of the SUL, and is used to perform BWP configuration in the SUL. The configuration information of the SUL may be carried in radio resource control (RRC) signaling sent by the network device #A to the terminal device #B. In addition, In some embodiments, the RRC signaling may be dedicated RRC signaling of the terminal device #B.

As an example rather than a limitation, in this embodiment of this application, the foregoing method may further be used in BWP configuration of an uplink carrier in a primary cell Pcell in FDD. In this case, the information #3 may be carried in remaining minimum system information (RMSI), and is used to perform BWP configuration on the uplink carrier in the Pcell in FDD.

Manner 2

In some embodiments, the network device #A and the terminal device #B may determine, based on a parity of the offset, the identifier of the subcarrier corresponding to the reference point #1.

For example, if the offset is an odd number, or the information #2 determines that the quantity of offset units between the reference point #1 and the reference point #2 is an odd number, the network device #A and the terminal device #B may determine that the reference point #1 corresponds to the subcarrier #0.

If the offset is an even number, or the information #2 determines that the quantity of offset units between the reference point #1 and the reference point #2 is an even number, the network device #A and the terminal device #B may determine that the reference point #1 corresponds to the subcarrier #6.

It should be understood that the foregoing listed specific rules according to which the network device #A and the terminal device #B may determine, based on the parity of the offset, the identifier of the subcarrier corresponding to the reference point #1 are merely examples for description, and this application is not limited thereto. For example, if the offset is an odd number, the network device #A and the terminal device #B may determine that the reference point #1 corresponds to the subcarrier #6. If the offset is an even number, the network device #A and the terminal device #B may determine that the reference point #1 corresponds to the subcarrier #0.

In some embodiments, in this embodiment of this application, when determining that a proportion of the offset unit to the resource unit meets a specified requirement, the network device #A and the terminal device #B may determine, based on the parity of the offset, the identifier of the subcarrier corresponding to the reference point #1.

For example, in this embodiment of this application, when determining that the size of one offset unit is ½ resource unit, the network device #A and the terminal device #B may determine, based on the parity of the offset, the identifier of the subcarrier corresponding to the reference point #1.

That is, in this case, the terminal device #B further needs to learn of the proportion of the offset unit to the resource unit.

As an example rather than a limitation, for example, the proportion of the offset unit to the resource unit (that is, the size of one offset unit is 1 resource unit or ½ resource unit) may be predefined. For example, the proportional relationship between the offset unit and the resource unit may be specified in a communication protocol. For another example, the proportional relationship between the offset unit and the resource unit may be preset by an operator or a manufacturer in the network device and the terminal device. For another example, the proportional relationship between the offset unit and the resource unit may be entered by a user or an administrator to the network device and the terminal device.

In some embodiments, as in this embodiment, the network device #A may further send information #4 to the terminal device #B. The information #4 may be used to indicate the proportion of the offset unit to the resource unit.

Therefore, the terminal device #B may determine the proportion of the offset unit to the resource unit based on the information #4, and further may determine, based on the parity of the offset when the size of one offset unit is ½ resource unit, the identifier of the subcarrier corresponding to the reference point #1.

Therefore, the terminal device #B may determine, in the foregoing manner 1 or manner 2 based on the information #3, the identifier of the subcarrier corresponding to the reference point #1, and further, may determine a grid of the PRB in the system bandwidth.

In this embodiment, for determining of the position of the PRB, in addition to the position of the reference point #1, the identifier of the subcarrier corresponding to the reference point #1, and the offset, the size of the offset unit is also needed.

In this embodiment, the terminal device #B may determine a position of a PRB #0' based on a default size of the offset unit, and further determine the position of the PRB #0 based on a preset positional relationship (that is, a manner a), or the terminal device #B may determine the size of the offset unit, and further determine the position of the PRB #0 based on the foregoing parameters (that is, a manner b). The following describes the two manners in detail.

Manner a

In this embodiment, the terminal device #B may determine, based on the position of the reference point #1, the identifier of the subcarrier corresponding to the reference point #1, the offset, and the default size of the offset unit, the position of the PRB (denoted as the PRB #0') corresponding to a default start point of a PRB number.

For example, the network device #A may send information #6 to the terminal device #B. The information #6 is used to indicate the default size of the offset unit (or a default size of the resource unit).

For another example, the default size of the offset unit may be determined based on default system information. The default system information may be information about any parameter of a default numerology, a default subcarrier spacing, or a default CP.

For example, assuming that the default subcarrier spacing is 15 kHz, the terminal device #B may determine the default size of the resource unit (½ PRB or 6 subcarriers) based on Table 1 when the default subcarrier spacing is 15 kHz. Further, the terminal device #B may determine the default size of the offset unit based on the default size of the resource unit and the proportion of the offset unit to the resource unit.

The default system information may be predefined. For example, the default system information may be specified in a communication protocol. For another example, the default system information may be preset by an operator or a manufacturer in the network device or the terminal device. For another example, the default system information may be entered by a user or an administrator to the network device and the terminal device.

Alternatively, the network device #A may send the default system information to the terminal device #B.

Therefore, the terminal device #B may determine the position of the PRB #0' based on the position of the reference point #1, the identifier of the subcarrier corresponding to the reference point #1, the offset, and the default size of the offset unit when the subcarrier spacing is default.

Figure 4:
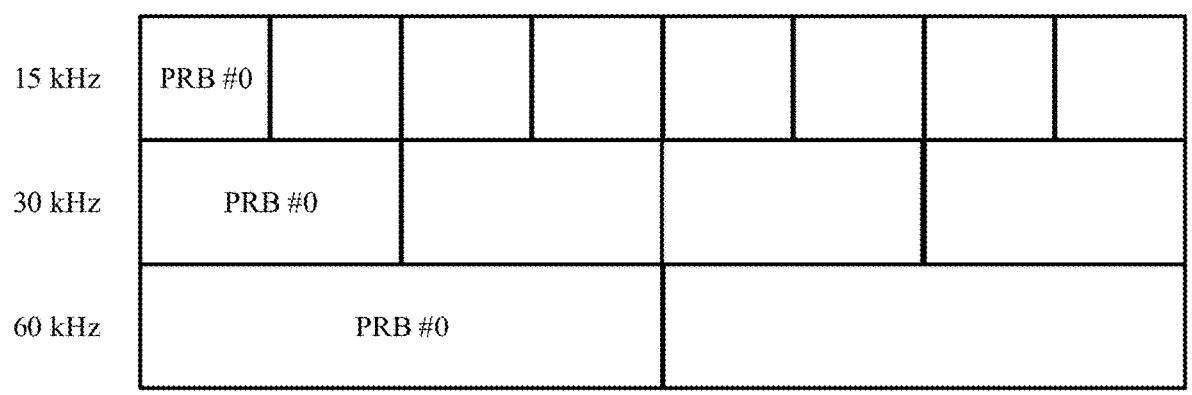
FIG. 4 is a schematic diagram of an example of a positional relationship between PRBs.

In this embodiment, the network device #A and the terminal device #B may obtain positional relationship information. The positional relationship information may be used to indicate a positional relationship between PRBs corresponding to start points of PRB numbers based on a plurality of types of system information. For example, FIG. 4 shows an example of the positional relationship.

Therefore, the terminal device #B may determine, based on the foregoing positional relationship and the foregoing determined position of the PRB #0', the position of the PRB #0 based on a system parameter actually used by the system bandwidth #A.

Figure 5:
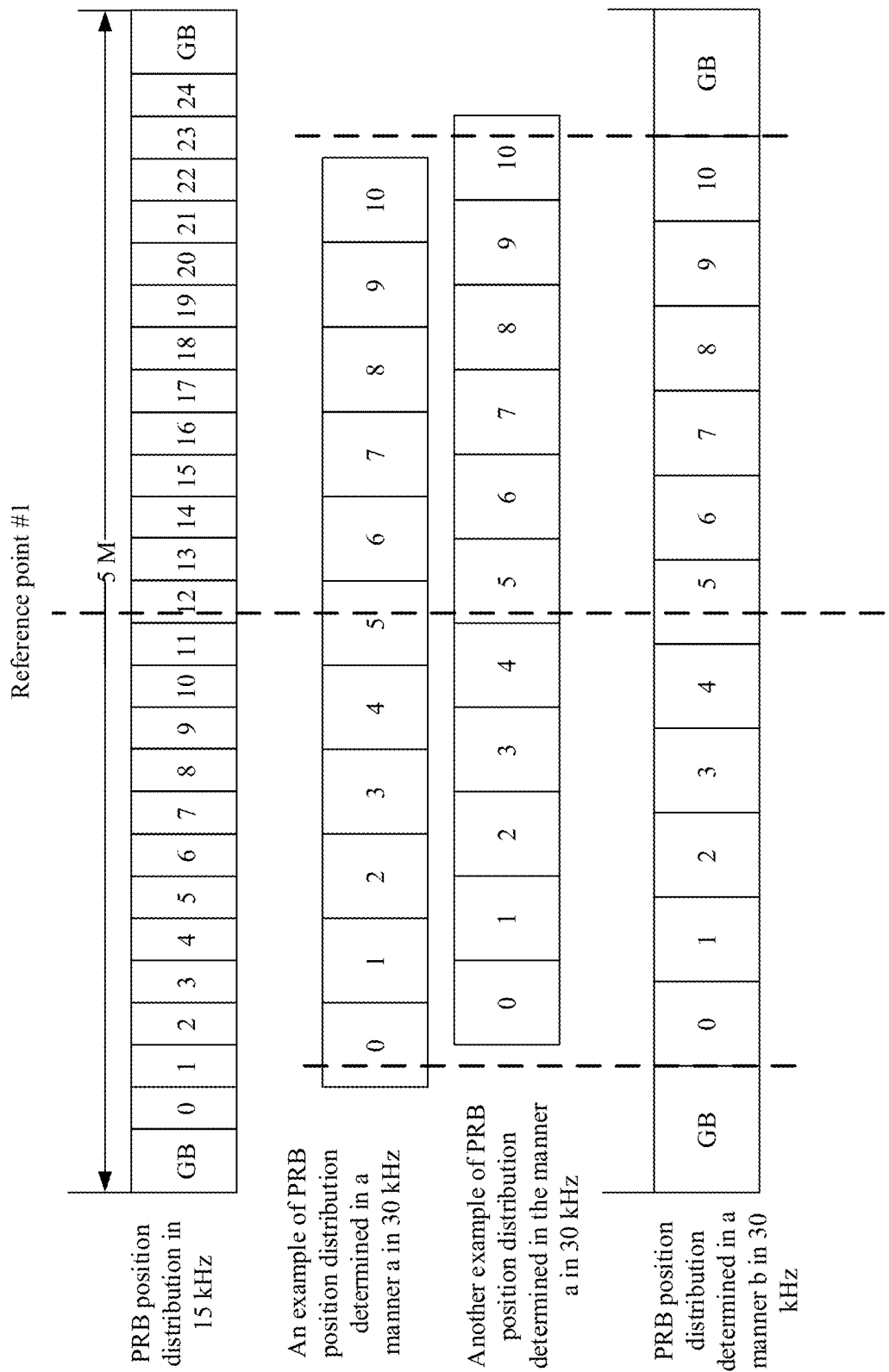
FIG. 5 is a schematic diagram of another example of a positional relationship between PRBs.

FIG. 5 shows an example of numbers of PRBs in a system bandwidth when the default numerology is 15 kHz and an actual numerology that is determined in the manner a is 30 kHz.

Manner b

In this embodiment of this application, the terminal device #B may further determine the size of the offset unit (or the size of the resource unit).

For example, the network device #A may send information #5 (that is, an example of fifth indication information) to the terminal device #B. The information #5 is used to indicate the size of the offset unit (or the size of the resource unit).

For another example, the size of the offset unit may be determined based on system information. For example, the system information may include information about any parameter of a numerology used by the system bandwidth #A, a subcarrier spacing, or a CP.

For example, assuming that the subcarrier spacing used by the system bandwidth #A is 30 kHz, the terminal device #B may determine the size of the resource unit (¼ PRB or 3 subcarriers) based on Table 1 when the subcarrier spacing is 30 kHz. Further, the terminal device #B may determine the size of the offset unit based on the size of the resource unit and the proportion of the offset unit to the resource unit.

The system information may be predefined. For example, the system information may be specified in a communication protocol. For another example, the system information may be preset by an operator or a manufacturer in the network device or the terminal device. For another example, the system information may be entered by a user or an administrator to the network device and the terminal device.

In some embodiments, the network device #A may send the system information to the terminal device #B.

Therefore, the terminal device #B may determine, based on the position of the reference point #1, the identifier of the subcarrier corresponding to the reference point #1, the offset, and the size of the default offset unit when the subcarrier spacing is specified, the position of the PRB #0 determined by the network device #A.

As an example rather than a limitation, for example, in this embodiment, 3 bits may be used to indicate the system information, that is, the indication information is 15 kHz, 30 kHz, 60 kHz, 120 kHz, 240 kHz, or 480 kHz.

For another example, the system information may be indicated with reference to a frequency band in which the system bandwidth is located.

For example, when the frequency band (Band) in which the system bandwidth is located is lower than 6 GHz, a possible numerology of the system information is 15 kHz, 30 kHz, or 60 kHz, so that 2-bit indication information may be used to distinguish the system information.

For another example, when the frequency band in which the system bandwidth is located is at least 6 GHz, a possible numerology of the system information is 60 kHz or 120 kHz, so that 2-bit indication information may be used to distinguish the system information.

Figure 7:
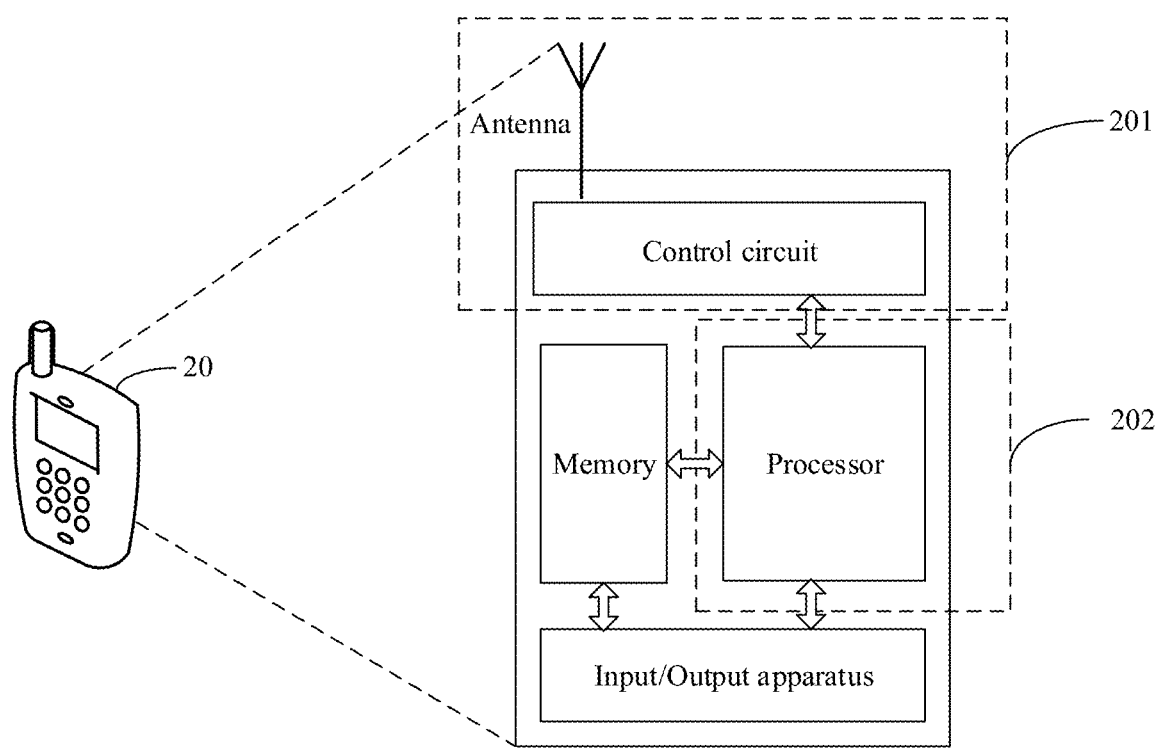
FIG. 7 is a schematic block diagram of an example of a terminal device according to an embodiment of this application.

As shown in FIG. 5, an example in which the system bandwidth is 5 MHz is used. It is assumed that a default numerology (that is, an example of the system information) predefined by the network device and the terminal device is 15 kHz. Actually, on the carrier, the network device schedules 30 kHz of data for the terminal device. In this case, based on the default system information, the system bandwidth may include 25 PRBs, and a minimum guard band is symmetrically distributed on two sides of the carrier. To ensure that PRB boundaries of different numerologies are aligned, a possible position of a 30-kHz PRB grid is shown in FIG. 5. A minimum protection bandwidth required by 30 kHz is shown in FIG. 7. Therefore, to ensure normal use of a 30-kHz service, a PRB #0 or a PRB #10 in FIG. 5 cannot be used. In actual application, one PRB is wasted.

Therefore, based on the manner b, because the network device may indicate the numerology to the terminal device, the terminal device may directly determine, in the manner b, that the identifier of the subcarrier corresponding to the reference point is No. 6. In this case, all the 11 PRBs determined in the manner b can be normally used, and none of the PRBs is wasted.

In addition, in this embodiment, the system bandwidth may be a bandwidth of a carrier used in an FDD manner.

In this case, the technology provided in this embodiment may be applied to uplink BWP configuration in an FDD case.

In some embodiments, for a primary cell (Pcell), the solution provided in this embodiment of this application may be applied to resource scheduling for uplink transmission.

In this case, information indicating whether the reference point #1 corresponds to the subcarrier #0 or the subcarrier #6 may be included in the RMSI.

In some embodiments, whether the reference point #1 corresponds to the subcarrier #0 or the subcarrier #6 may be implemented by adjusting the quantity of offset units (or the size of the resource unit). For example, the size of the resource unit may be half of a PRB size in a numerology corresponding to a downlink detected synchronization signal block (Synchronization Signal Block, SSB).

For a secondary cell (Scell), the information indicating whether the reference point #1 corresponds to the subcarrier #0 or the subcarrier #6 may be carried in downlink Scell configuration information or uplink Scell configuration information.

The information indicating whether the reference point #1 corresponds to the subcarrier #0 or the subcarrier #6 may be sent together with downlink offset indication information, or the information indicating whether the reference point #1 corresponds to the subcarrier #0 or the subcarrier #6 may be sent together with uplink offset indication information.

In addition, for the Scell, a correspondence between an uplink numerology and an offset may be further indicated, or a relationship between an uplink numerology and a size of a resource unit may be predefined.

As an example rather than a limitation, in this embodiment of this application, the foregoing method may further be used in BWP configuration of a supplementary uplink (SUL). In this case, the information indicating whether the reference point #1 corresponds to the subcarrier #0 or the subcarrier #6 may be included in the configuration information of the SUL. In addition, the configuration information of the SUL may be carried in radio resource control (RRC) signaling sent by the network device #A to the terminal device #B. In addition, In some embodiments, the RRC signaling may be dedicated RRC signaling of the terminal device #B.

The information indicating whether the reference point #1 corresponds to the subcarrier #0 or the subcarrier #6 may be sent together with the uplink offset indication information.

In addition, for an SUL cell, a correspondence between an uplink numerology and an offset may be further indicated, or a relationship between an uplink numerology and the size of the resource unit may be predefined.

In this embodiment, some or all of the foregoing information #1 to information #6 may be carried in a same message or same signaling for sending, or some or all of the foregoing information #1 to information #6 may be carried in different messages or different signaling for separate sending. This is not particularly limited herein.

Therefore, based on the foregoing process, a process of determining the PRB #0 can be completed when the terminal device does not learn of the size of the system bandwidth. Because the network device does not need to notify the terminal device of the size of the system bandwidth, a flexible change in a carrier bandwidth can be supported, and a method for using a spectrum can be adjusted. For example, a part of bandwidth may be reserved for another use. Inter-cell interference coordination can be implemented. Strong interference can be avoided by adjusting a center and bandwidth of a carrier. Different carriers may be used for different applications. For example, different carriers may be used for an eMBB service and a URLLC service. This feature can adapt to a flexible change in a service volume. In addition, in LTE, the system bandwidth is notified by using a PBCH. In NR, to adapt to a flexible change in the system bandwidth, if the PBCH is still used for notification, UE may not work normally after the system bandwidth changes. In this case, a cell needs to be restarted, all UEs need to be disconnected and re-connected, and therefore, a process becomes complex. According to the communication method provided in this application, this problem can be avoided.

Figure 6:
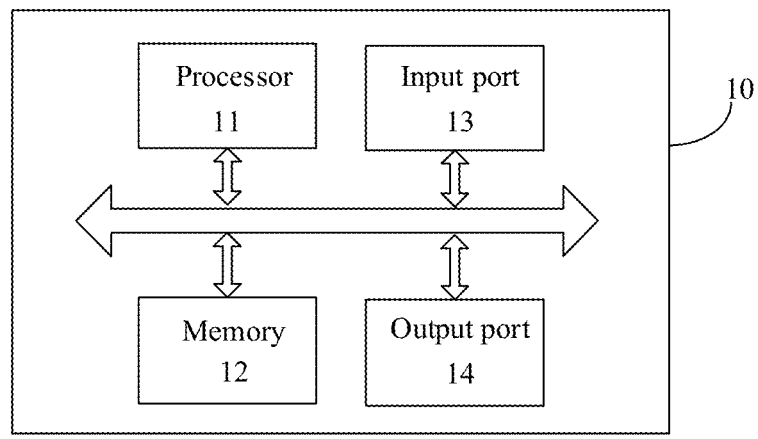
FIG. 6 is a schematic block diagram of an example of a communications apparatus according to this application.

According to the foregoing method, FIG. 6 is a first schematic diagram of a communications apparatus 10 according to an embodiment of this application. As shown in FIG. 6, the apparatus 10 may be a terminal device (for example, the terminal device #B), or may be a chip or a circuit, for example, a chip or a circuit that may be disposed in a terminal device. The terminal device may correspond to the terminal device in the foregoing method.

The apparatus 10 may include a processor 11 (an example of a processing unit) and a memory 12. The memory 12 is configured to store an instruction. The processor 11 is configured to execute the instruction stored in the memory 12, so that the apparatus 20 implements the steps performed by the terminal device (for example, the terminal device #A) in the corresponding method shown in FIG. 2.

Further, the apparatus 10 may further include an input port 13 (an example of a communications unit) and an output port 14 (another example of the communications unit). Further, the processor 11, the memory 12, the input port 13, and the output port 14 may communicate with each other by using an internal connection path, to transmit a control and/or data signal. The memory 12 is configured to store a computer program. The processor 11 may be configured to invoke the computer program from the memory 12 and run the computer program, to control the input port 13 to receive a signal, and control the output port 14 to send a signal, so as to complete the steps performed by the terminal device in the foregoing method. The memory 12 may be integrated into the processor 11, or may be separated from the processor 11.

In some embodiments, if the apparatus 10 is a terminal device, the input port 13 is a receiver, and the output port 14 is a transmitter. The receiver and the transmitter may be a same physical entity or different physical entities. When the receiver and the transmitter are a same physical entity, the receiver and the transmitter may be collectively referred to as a transceiver.

In some embodiments, if the apparatus 10 is a chip or a circuit, the input port 13 is an input interface, and the output port 14 is an output interface.

In an implementation, functions of the input port 13 and the output port 14 may be implemented by using a transceiver circuit or a dedicated transceiver chip. The processor 11 may be implemented by using a dedicated processing chip, processing circuit, or processor, or a universal chip.

In another implementation, it may be considered that the terminal device provided in this embodiment of this application is implemented by using a general-purpose computer. In other words, program code for implementing the functions of the processor 11, the input port 13, and the output port 14 is stored in the memory 12, and a general-purpose processor executes the code in the memory 12 to implement the functions of the processor 11, the input port 13, and the output port 14.

In this embodiment, the input port 13 may be configured to receive first indication information and second indication information from a network device. The first indication information is used to indicate a position of a first reference point. The second indication information is used to indicate a first quantity. The first quantity is a quantity of offset units between the first reference point and a second reference point. The second reference point is an endpoint of a first physical resource block PRB. The first PRB is a PRB corresponding to a start point of a PRB number of a system bandwidth used by the network device based on first system information. The first system information includes information about at least one parameter of a first numerology numerology, a subcarrier spacing corresponding to the first numerology, or a cyclic prefix CP corresponding to the first numerology.

The processor 11 is configured to determine a position of the first physical resource block PRB based on the first indication information, the second indication information, and an identifier of a subcarrier corresponding to the first reference point.

The foregoing listed functions and actions of the modules or units in the communications apparatus 10 are merely examples for description. The modules or units in the communications apparatus 10 may be configured to perform actions or processing processes performed by the terminal device in the method 200. To avoid repetition, detailed descriptions are omitted herein.

For concepts, explanations, and detailed descriptions used by the apparatus 7 and related to the technical solutions provided in this embodiment of this application and other steps, refer to the descriptions of the content in the foregoing method or other embodiments. Details are not described herein again.

FIG. 7 is a schematic structural diagram of a terminal device 20 according to this application. The terminal device 20 may be applied to the system shown in FIG. 1. For ease of description, FIG. 7 shows only main components of the terminal device. As shown in FIG. 7, the terminal device 20 includes a processor, a memory, a control circuit, an antenna, and an input/output apparatus.

The processor is mainly configured to: process a communication protocol and communication data, control the entire terminal device, execute a software program, and process data of the software program, for example, is configured to support the terminal device in performing the action described in the embodiment of the foregoing indication method for transmitting a precoding matrix. The memory is mainly configured to store a software program and data, for example, store a codebook described in the foregoing embodiment. The control circuit is mainly configured to: perform conversion between a baseband signal and a radio frequency signal, and process a radio frequency signal. The control circuit and the antenna may be collectively referred to as a transceiver that is mainly configured receive and transmit a radio frequency signal in an electromagnetic wave form. The input/output apparatus such as a touchscreen, a display screen, or a keyboard is mainly configured to: receive data entered by a user, and output data to the user.

After the terminal device is powered on, the processor may read a software program in a storage unit, explain and execute an instruction of the software program, and process data of the software program. When data needs to be sent in a wireless manner, after performing baseband processing on the to-be-sent data, the processor outputs a baseband signal to a radio frequency circuit. After the radio frequency circuit performs radio frequency processing on the baseband signal, a radio frequency signal is sent by using the antenna in an electromagnetic wave form. When data is sent to the terminal device, the radio frequency circuit receives a radio frequency signal by using the antenna, converts the radio frequency signal into a baseband signal, and outputs the baseband signal to the processor. The processor converts the baseband signal into data, and processes the data.

A person skilled in the art may understand that for ease of description, FIG. 4 shows only one memory and only one processor. Actually, the terminal device may include a plurality of processors and a plurality of memories. The memory may also be referred to as a storage medium, a storage device, or the like. This is not limited in this embodiment of this application.

In an example implementation, the processor may include a baseband processor and a central processing unit. The baseband processor is mainly configured to process a communication protocol and communication data. The central processing unit is mainly configured to: control the entire terminal device, execute a software program, and process data of the software program. The processor in FIG. 4 integrates functions of the baseband processor and the central processing unit. A person skilled in the art may understand that the baseband processor and the central processing unit may alternatively be separate processors, and are interconnected by using a technology such as a bus. A person skilled in the art may understand that the terminal device may include a plurality of baseband processors to adapt to different network standards, the terminal device may include a plurality of central processing units to improve a processing capability of the terminal device, and components of the terminal device may be connected by using various buses. The baseband processor may also be expressed as a baseband processing circuit or a baseband processing chip. The central processing unit may also be expressed as a central processing circuit or a central processing chip. A function of processing the communication protocol and the communication data may be embedded into the processor, or may be stored in the storage unit in a form of a software program. The processor executes the software program to implement a baseband processing function.

Figure 8:
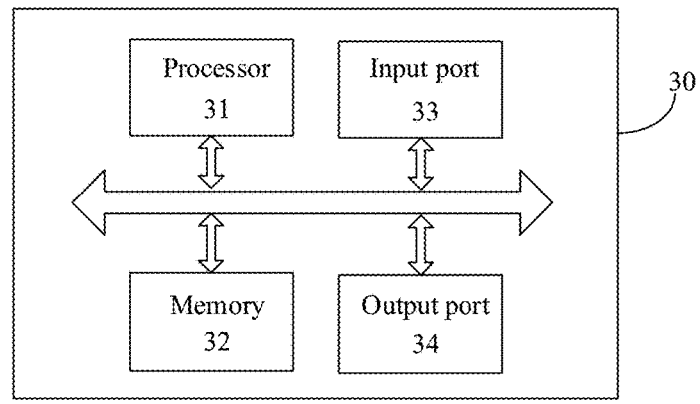
FIG. 8 is a schematic block diagram of another example of a communications apparatus according to this application.

For example, in this embodiment of this application, an antenna having a transceiving function and a control circuit may be considered as a transceiver unit 201 of the terminal device 20, and a processor having a processing function may be considered as a processing unit 202 of the terminal device 20. As shown in FIG. 8, the terminal device 20 includes the transceiver unit 201 and the processing unit 202. The transceiver unit may also be referred to as a transceiver, a transceiver machine, a transceiver apparatus, or the like. In some embodiments, a component configured to implement a receiving function in the transceiver unit 201 may be considered as a receiving unit, and a component configured to implement a sending function in the transceiver unit 201 may be considered as a sending unit. In other words, the transceiver unit 201 includes the receiving unit and the sending unit. For example, the receiving unit may also be referred to as a receiver, a receiver, a receiver circuit, or the like, and the sending unit may be referred to as a transmitter, a transmitter, a transmitter circuit, or the like.

According to the foregoing method, FIG. 8 is a second schematic diagram of a communications apparatus 30 according to an embodiment of this application. As shown in FIG. 8, the apparatus 30 may be a network device (for example, the network device #A), or may be a chip or a circuit, for example, a chip or a circuit that may be disposed in a network device. The network device corresponds to the network device (for example, the network device #A) in the foregoing method.

The apparatus 30 may include a processor 31 (an example of a processing unit) and a memory 32. The memory 32 is configured to store an instruction. The processor 31 is configured to execute the instruction stored in the memory 32, so that the apparatus 30 implements the steps performed by the network device (for example, the network device #A) in the corresponding method shown in FIG. 2.

Further, the apparatus 30 may further include an input port 33 (an example of a communications unit) and an output port 33 (another example of the processing unit). Still further, the processor 31, the memory 32, the input port 33, and the output port 34 may communicate with each other by using an internal connection path, to transmit a control and/or data signal. The memory 32 is configured to store a computer program. The processor 31 may be configured to invoke the computer program from the memory 32 and run the computer program, to control the input port 33 to receive a signal, and control the output port 34 to send a signal, so as to complete the steps performed by the network device in the foregoing method 200. The memory 32 may be integrated into the processor 31, or may be separated from the processor 31.

In some embodiments, if the apparatus 30 is a network device, the input port 33 is a receiver, and the output port 34 is a transmitter. The receiver and the transmitter may be a same physical entity or different physical entities. When the receiver and the transmitter are a same physical entity, the receiver and the transmitter may be collectively referred to as a transceiver.

In some embodiments, if the apparatus 30 is a chip or a circuit, the input port 33 is an input interface, and the output port 34 is an output interface.

In some embodiments, if the apparatus 30 is a chip or a circuit, the apparatus 30 may not include the memory 32. The processor 31 may read an instruction (a program or code) in a memory outside the chip, to implement the functions of the network device in the corresponding method shown in FIG. 2.

In an implementation, it may be considered that functions of the input port 33 and the output port 34 are implemented by using a transceiver circuit or a dedicated transceiver chip. It may be considered that the processor 31 is implemented by using a dedicated processing chip, processing circuit, or processor, or a universal chip.

In another implementation, it may be considered that the network device provided in this embodiment of this application is implemented by using a general-purpose computer. In other words, program code for implementing the functions of the processor 31, the input port 33, and the output port 34 is stored in the memory, and a general-purpose processor executes the code in the memory to implement the functions of the processor 31, the input port 33, and the output port 34.

The modules or units in the communications apparatus 30 may be configured to perform actions or processing processes performed by the network device in the method 200. To avoid repetition, detailed descriptions are omitted herein.

For concepts, explanations, and detailed descriptions used by the apparatus 30 and related to the technical solutions provided in this embodiment of this application and other steps, refer to the descriptions of the content in the foregoing method or other embodiments. Details are not described herein again.

Figure 9:
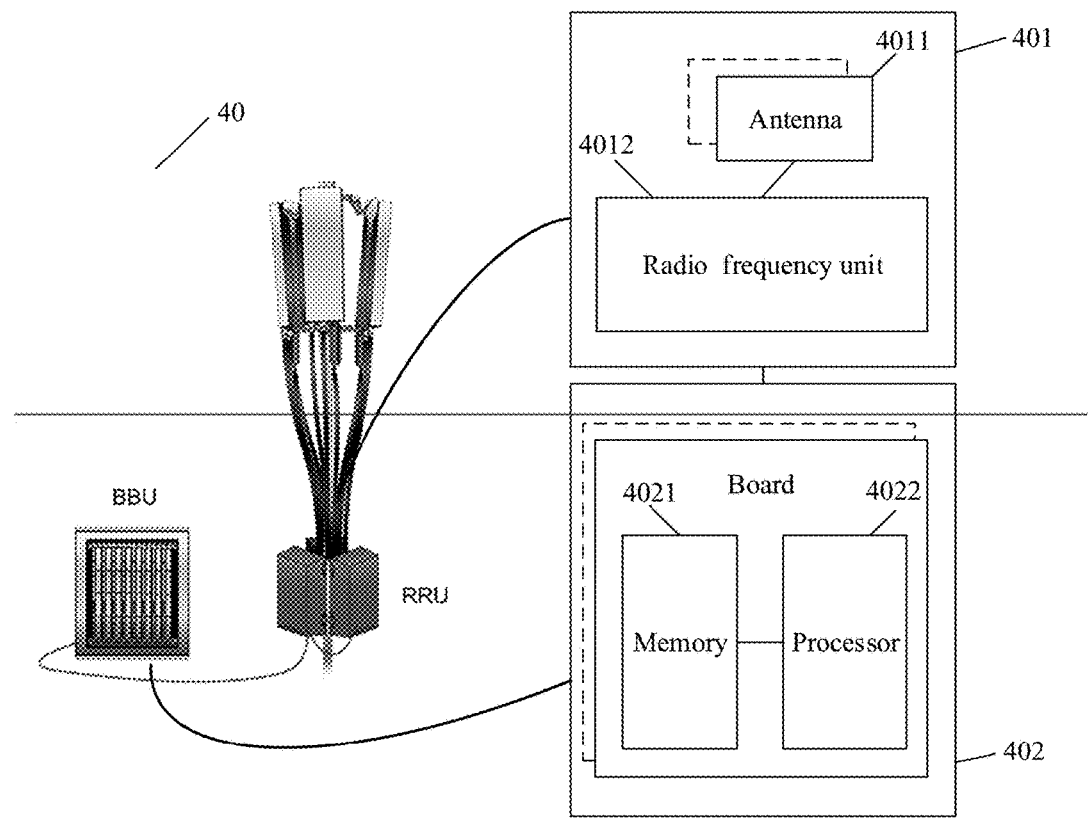
FIG. 9 is a schematic block diagram of another example of a network device according to an embodiment of this application.

FIG. 9 is a schematic structural diagram of a network device according to an embodiment of this application. The network device may be configured to implement the functions of the network device in the foregoing method. For example, FIG. 9 may be a schematic structural diagram of a base station. As shown in FIG. 9, the base station may be applied to the system shown in FIG. 1. The base station 40 includes one or more radio frequency units, such as a remote radio unit (remote radio unit, RRU) 401 and one or more baseband units (baseband unit, BBU) (also referred to as digital units, digital units, DUs) 402. The RRU 401 may be referred to as a transceiver unit, a transceiver, a transceiver circuit, a transceiver, or the like, and may include at least one antenna 4011 and a radio frequency unit 4012. The RRU 401 is mainly configured to receive and send a radio frequency signal and perform conversion between a radio frequency signal and a baseband signal, for example, configured to send the signaling message in the foregoing embodiments to a terminal device. The BBU 402 is mainly configured to: perform baseband processing, control the base station, and so on. The RRU 401 and the BBU 402 may be physically disposed together, or may be physically disposed separately, to be specific, may be on a distributed base station.

The BBU 402 is a control center of the base station, may also be referred to as a processing unit, and is mainly configured to implement a baseband processing function, for example, channel coding, multiplexing, modulation, and spreading. For example, the BBU (the processing unit) 402 may be configured to control the base station 40 to perform the operation procedure related to the network device in the method embodiments.

In an example, the BBU 402 may include one or more boards, and a plurality of boards may together support a radio access network (for example, an LTE system, or a 5G system) of a single access standard, or may separately support radio access networks of different access standards. The BBU 402 further includes a memory 4021 and a processor 4022. The memory 4021 is configured to store a necessary instruction and necessary data. For example, the memory 4021 stores the codebook and the like in the foregoing embodiments. The processor 4022 is configured to control the base station to perform a necessary action. For example, the processor 4022 is configured to control the base station to perform the operation procedure related to the network device in the foregoing method embodiments. The memory 4021 and the processor 4022 may serve one or more boards. In other words, each board may be provided with a memory and a processor. Alternatively, a plurality of boards may share a same memory and a same processor. In addition, each board may further be provided with a necessary circuit.

In a possible implementation, with development of a system-on-chip (SoC) technology, all or some functions of the components 402 and 401 may be implemented by using the SoC technology, for example, implemented by using one base station function chip. The base station function chip integrates components such as a processor, a memory, and an antenna port. A program of a base station-related function is stored in the memory. The processor executes the program to implement the base station-related function. In some embodiments, the base station function chip can further read a memory outside the chip to implement the base station-related function.

It should be understood that the structure of the base station shown in FIG. 9 is merely a possible form, but should not constitute any limitation to this embodiment of this application. In this application, a possibility that there may be a base station structure in another form in the future is not excluded.

According to the method provided in various embodiments, an embodiment of this application further provides a communications system. The system includes the foregoing network device and one or more terminal devices.

It should be understood that, in various embodiments, the processor may be a central processing unit (CPU), or the processor may be another general-purpose processor, a digital signal processor (DSP), an application-specific integrated circuit (ASIC), a field programmable gate array (FPGA) or another programmable logic device, a discrete gate or transistor logic device, a discrete hardware component, or the like. The general-purpose processor may be a microprocessor, or the processor may be any conventional processor or the like.

It may be further understood that the memory in various embodiments may be a volatile memory or a nonvolatile memory, or may include both a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. Through example but not limitative description, many forms of random access memories (RAM) are available, for example, a static random access memory (SRAM), a dynamic random access memory (DRAM), a synchronous dynamic random access memory (SDRAM), a double data rate synchronous dynamic random access memory (double data rate SDRAM, DDR SDRAM), an enhanced synchronous dynamic random access memory (enhanced SDRAM, ESDRAM), a synchronous link dynamic random access memory (synchlink DRAM, SLDRAM), and a direct rambus random access memory (direct rambus RAM, DR RAM).

All or some of the foregoing embodiments may be implemented by means of software, hardware, firmware, or any combination thereof. When software is used to implement the embodiments, the foregoing embodiments may be implemented completely or partially in a form of a computer program product. The computer program product includes one or more computer instructions or computer programs. When the program instructions or the computer programs are loaded and executed on the computer, the procedure or functions according to various embodiments are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, infrared, radio, and microwave, or the like) manner. The computer-readable storage medium may be any available medium accessible by a computer, or a data storage device, such as a server or a data center, integrating one or more available media. The available medium may be a magnetic medium (for example, a floppy disk, a hard disk, or a magnetic tape), an optical medium (for example, a DVD), or a semiconductor medium. The semiconductor medium may be a solid-state drive.

It should be understood that the term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that identifiers of the foregoing processes do not mean execution sequences in various embodiments of this application. The execution sequences of the processes should be determined according to functions and internal logic of the processes, and should not be construed as any limitation on the implementation processes of various embodiments.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application. A person skilled in the art may clearly understand that, for the purpose of convenient and brief description, for a detailed working process of the foregoing system, apparatus, and unit, refer to a corresponding process in the foregoing method embodiments, and details are not described herein again. In the several embodiments provided in this application, it should be understood that the disclosed system, apparatus, and method may be implemented in other manners. For example, the described apparatus embodiment is merely an example. For example, the unit division is merely logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments. In addition, functional units in various embodiments may be integrated into one processing unit, or each of the units may exist alone physically, or two or more units are integrated into one unit. When the functions are implemented in the form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in various embodiments. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A communication method, comprising:

receiving, by a terminal device, first indication information and second indication information from a network device, wherein the first indication information indicates a position of a first reference point, the second indication information indicates a first quantity, the first quantity is a quantity of offset units between the first reference point and a second reference point, and the second reference point is an endpoint of a first physical resource block (PRB); and determining, by the terminal device, a position of the first PRB based on the first indication information, the second indication information, and an identifier of a subcarrier corresponding to the first reference point, wherein the identifier of the subcarrier corresponding to the first reference point has a correspondence with a case of whether the first quantity is an odd number or an even number.

2. The communication method according to claim 1, wherein determining, by the terminal device based on the parity of the first quantity, the identifier of the subcarrier corresponding to the first reference point comprises:

determining, by the terminal device based on a first condition and a second condition, the identifier of the subcarrier corresponding to the first reference point, wherein the first condition is whether the first quantity is an odd number or an even number, and the second condition is a whether a size of one offset unit is a resource unit or half a resource unit.

3. The communication method according to claim 2, wherein the second condition is predefined; or the method further comprises:

receiving, by the terminal device, fourth indication information from the network device, wherein the fourth indication information is indicates the second condition.

4. The communication method according to claim 3, wherein determining, by the terminal device, the position of the first PRB based on the first indication information, the second indication information, and the identifier of a subcarrier corresponding to the first reference point comprises:

determining, by the terminal device, the position of the first PRB based on the first indication information, the second indication information, the identifier of the subcarrier corresponding to the first reference point, and the size of the offset unit.

5. The communication method according to claim 4, wherein the size of the offset unit is a preset value;

the size of the offset unit is determined based on first system information, and the first system information comprises information about at least one parameter of a first numerology, a subcarrier spacing corresponding to the first numerology, or a cyclic prefix (CP) corresponding to the first numerology; or the method further comprises: receiving, by the terminal device, fifth indication information from the network device, wherein the fifth indication information is used to indicate the size of the offset unit.

6. A communication method, comprising:

receiving, by a terminal device, first indication information and second indication information from a network device, wherein the first indication information indicates a position of a first reference point, the second indication information indicates a first quantity, the first quantity is a quantity of offset units between the first reference point and a second reference point, and the second reference point is an endpoint of a first physical resource block (PRB); and determining, by the terminal device, a position of the first PRB based on the first indication information, the second indication information, and an identifier of a subcarrier corresponding to the first reference point, wherein the first PRB is configured for numbering each PRB in a public bandwidth based on first system information, and the first system information comprises information about at least one parameter of a first numerology, a subcarrier spacing corresponding to the first numerology, or a cyclic prefix (CP) corresponding to the first numerology.

7. The communication method according to claim 6, wherein the first system information is predefined; or the method further comprises:

receiving, by the terminal device, the first system information from the network device.

8. The communication method according to claim 6, wherein when system information used by the network device is the first system information, and the method further comprises:

numbering, by the terminal device, each PRB in the public bandwidth based on the first PRB.

9. The communication method according to claim 6, wherein when system information used by the network device is second system information, the method further comprises:

determining, by the terminal device, positional relationship information, wherein the positional relationship information indicates a positional relationship between K PRB s comprising the first PRB, the K PRB s have a one-to-one correspondence with K pieces of system information, each of the K PRBs is configured for numbering each PRB in a public bandwidth based on corresponding system information, and K is a positive integer greater than or equal to 2;

determining, by the terminal device, a position of the second PRB based on the positional relationship information and the position of the first PRB, wherein the second PRB corresponds to the second system information; and numbering, by the terminal device, each PRB in the system bandwidth based on the second PRB.

10. A communications apparatus, comprising:

a processor, configured to execute a computer program which is stored in a memory and which, when executed, causes the process to perform:

receiving first indication information and second indication information from a network device, wherein the first indication information indicates a position of a first reference point, the second indication information indicates a first quantity, the first quantity is a quantity of offset units between the first reference point and a second reference point, and the second reference point is an endpoint of a first physical resource block (PRB);

determining a position of the first PRB based on the first indication information, the second indication information, and an identifier of a subcarrier corresponding to the first reference point; and receiving third indication information from the network device, wherein the third indication information indicates the identifier of the subcarrier corresponding to the first reference point.

11. The communication apparatus according to claim 10, wherein determining the position of the first PRB based on the first indication information, the second indication information, and the identifier of a subcarrier corresponding to the first reference point comprises:

determining the position of the first PRB based on the first indication information, the second indication information, the identifier of the subcarrier corresponding to the first reference point, and a size of the offset unit.

12. The communication apparatus according to claim 11, wherein the size of the offset unit is a preset value; and the computer program, when executed, further causes the process to perform determining the size of the offset unit based on first system information, wherein the first system information comprises information about at least one parameter of a first numerology, a subcarrier spacing corresponding to the first numerology, or a cyclic prefix (CP) corresponding to the first numerology; or receiving, by the communication apparatus terminal device, fifth indication information from the network device, wherein the fifth indication information is used to indicate the size of the offset unit.

13. The communication apparatus according to claim 10, wherein the first PRB is configured for numbering each PRB in a public bandwidth based on first system information, and the first system information comprises information about at least one parameter of a first numerology, a subcarrier spacing corresponding to the first numerology, or a cyclic prefix (CP) corresponding to the first numerology.

14. The communication apparatus according to claim 13, wherein the first system information is predefined; or the processor is further caused to perform:

receiving, by the communication apparatus, the first system information from the network device.

* * * * *